United States Patent
Lv et al.

(10) Patent No.: US 12,254,796 B2
(45) Date of Patent: Mar. 18, 2025

(54) METHOD FOR REFRESHING SCREEN OF HEAD-MOUNTED DISPLAY DEVICE, AND HEAD-MOUNTED DISPLAY DEVICE

(71) Applicant: MATRIXED REALITY TECHNOLOGY CO., LTD., Wuxi (CN)

(72) Inventors: Xianwei Lv, Beijing (CN); Yu Zhang, Beijing (CN)

(73) Assignee: MATRIXED REALITY TECHNOLOGY CO., LTD., Wuxi (CN)

( * ) Notice: Subject to any disclaimer, the term of this patent is extended or adjusted under 35 U.S.C. 154(b) by 0 days.

(21) Appl. No.: 18/557,592

(22) PCT Filed: May 19, 2022

(86) PCT No.: PCT/CN2022/093762
§ 371 (c)(1),
(2) Date: Oct. 27, 2023

(87) PCT Pub. No.: WO2022/242704
PCT Pub. Date: Nov. 24, 2022

(65) Prior Publication Data
US 2024/0212536 A1    Jun. 27, 2024

(30) Foreign Application Priority Data
May 19, 2021    (CN) .......................... 202110546795.6

(51) Int. Cl.
*G09G 3/30*    (2006.01)
*G06F 3/01*    (2006.01)
(Continued)

(52) U.S. Cl.
CPC ............. *G09G 3/003* (2013.01); *G06F 3/012* (2013.01); *G09G 2340/0435* (2013.01); *G09G 2354/00* (2013.01)

(58) Field of Classification Search
CPC ........... G09G 3/003; G09G 2340/0435; G09G 2354/00; G06F 3/012
See application file for complete search history.

(56) References Cited

U.S. PATENT DOCUMENTS 11,016,560 B1 *    5/2021    Wenger ................ H04N 13/122
2011/0261034 A1 *    10/2011    Tsuchida ................ G09G 3/003
345/204

(Continued)

FOREIGN PATENT DOCUMENTS

CN    102270439 A    12/2011
CN    106998409 A    8/2017
(Continued)

OTHER PUBLICATIONS

International Search Report received in the corresponding International Application PCT/CN2022/093762, mailed Aug. 3, 2022.
(Continued)

*Primary Examiner* — Sanghyuk Park

(57) ABSTRACT

The present disclosure discloses a method for refreshing screens of a head-mounted display device, a head-mounted display device, and a non-transient computer readable storage medium configured to store computer instructions. The specific implementation is as follows: from a first time point to a second time point, sending first data to both the first screen and the second screen, and writing the first data to the first screen, with the first screen configured to be in a black screen state, and the second screen configured to be in a bright screen state for at least part of the time; and from the second time point to a third time point, sending second data to both the first screen and the second screen, and writing the (Continued)

second data to the second screen, with the second screen configured to be in the black screen state, and the first screen configured to be in the bright screen state for at least part of the time to display the first data.

20 Claims, 7 Drawing Sheets

(51) Int. Cl.
  *G09G 3/00* (2006.01)
  *G09G 3/36* (2006.01)

(56) References Cited

U.S. PATENT DOCUMENTS

| | | | |
|---|---|---|---|
| 2013/0342590 A1* | 12/2013 | Lee | H04N 13/302 |
| | | | 345/204 |
| 2015/0341624 A1 | 11/2015 | Kimura et al. | |
| 2018/0061121 A1 | 3/2018 | Yeoh et al. | |
| 2020/0126280 A1* | 4/2020 | Amimoto | G06F 3/012 |

FOREIGN PATENT DOCUMENTS

| | | |
|---|---|---|
| CN | 110221432 A | 9/2019 |
| CN | 111885265 A | 11/2020 |
| CN | 112015264 A | 12/2020 |
| CN | 113219668 A | 8/2021 |
| EP | 2387023 A2 | 11/2011 |
| EP | 2552119 A1 | 1/2013 |

OTHER PUBLICATIONS

First office action received in the corresponding Chinese Application 202110546795.6, mailed Aug. 15, 2022.
Second office action received in the corresponding Chinese Application 202110546795.6, mailed Mar. 4, 2023.
Extended ESR received in EP Application No. 22804024.2; mailed Oct. 29, 2024.

* cited by examiner

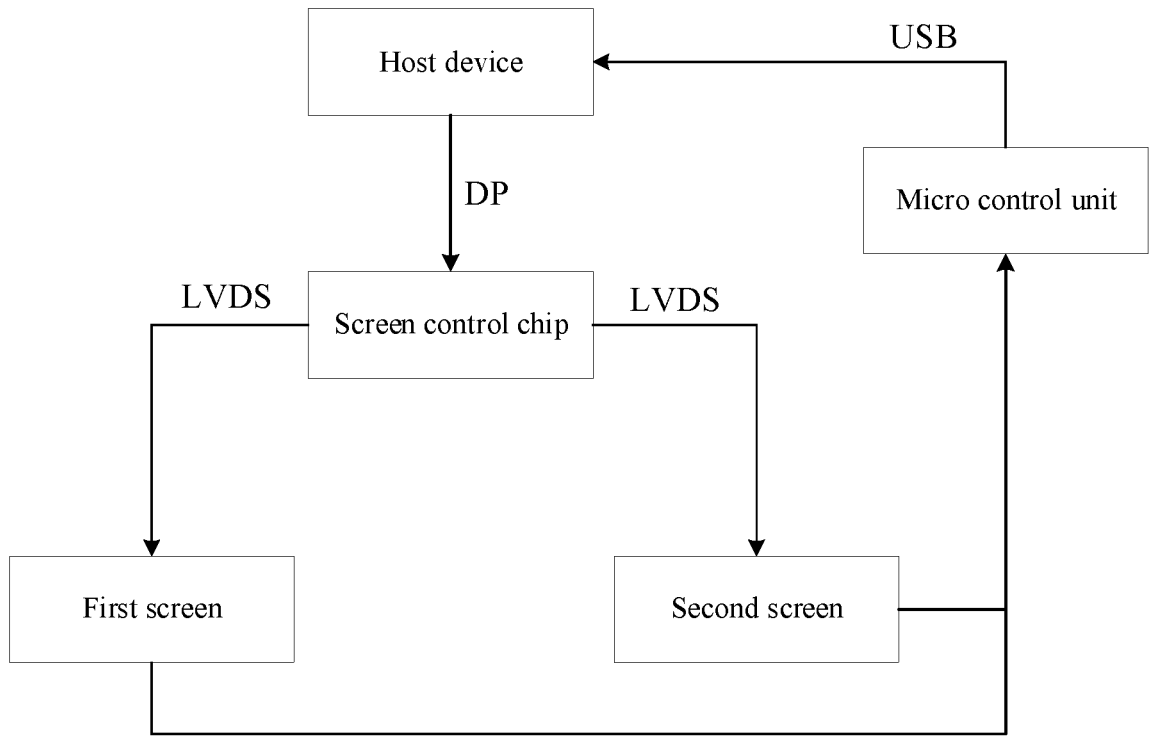

FIG. 1

From a first time point to a second time point, send first data to both the first screen and the second screen, and write the first data to the first screen, with the first screen configured to be in a black screen state, and the second screen configured to be in a bright screen state for at least part of the time — S110

From the second time point to a third time point, send second data to both the first screen and the second screen, and write the second data to the second screen, with the second screen configured to be in the black screen state, and the first screen configured to be in the bright screen state for at least part of the time to display the first data — S120

FIG. 2

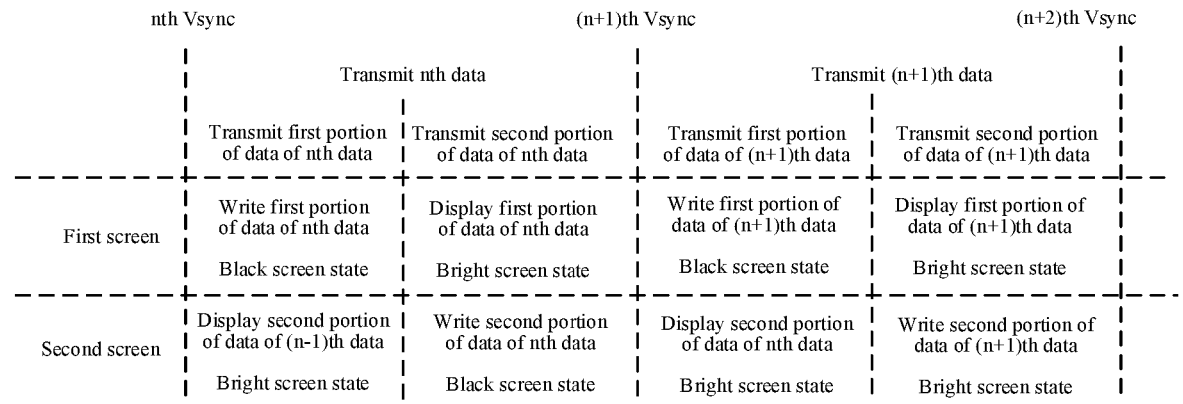

FIG. 6

Acquire a first pose of the user at a first preset time point, and calculate a first estimated pose of the user at a third preset time point based on the first preset time point, wherein the first preset time point is prior to the first time point, and the third preset time point is between the second time point and the third time point — S402

Acquire a second pose of the user at a second preset time point, and calculate a second estimated pose of the user at the third preset time point based on the second pose, wherein the second preset time point is between the first preset time point and the first time point — S404

At the second preset time point, transform at least a portion of the first data based on the first estimated pose and the second estimated pose so that the transformed first data corresponds to a pose of the user at the third preset time point — S406

FIG. 7A

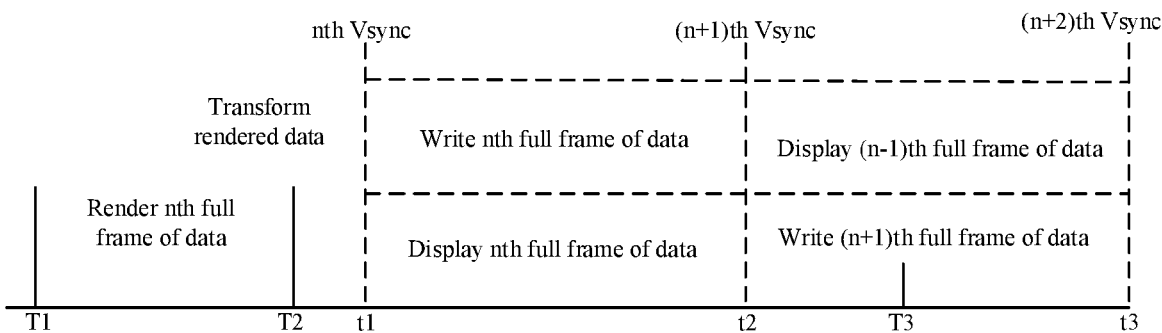

FIG. 7B

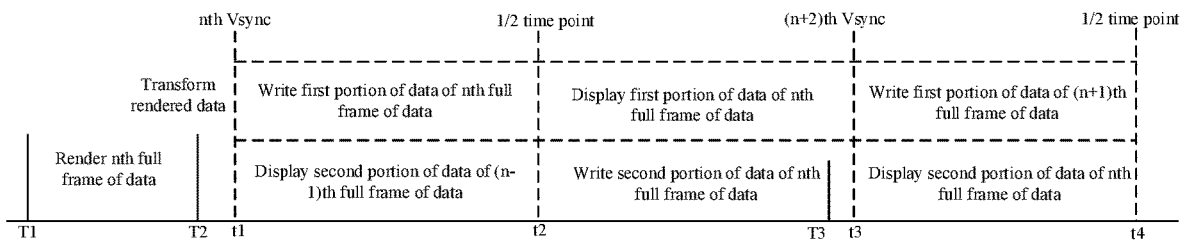

FIG. 8C

```
┌─────────────────────────────────────────────────────────────────────────────┐
│ Acquiring a first pose of the user at a first preset time point, calculating a first │
│  estimated pose of the user at a third preset time point and a third estimated     │── S420
│  pose of the user at a fifth preset time point based on the first pose, wherein the │
│  third preset time point is between the second time point and the third time       │
│  point, and the fifth preset time point is between the third time point and the    │
│                              fourth time point                                     │
└─────────────────────────────────────────────────────────────────────────────┘
                                    ↓
┌─────────────────────────────────────────────────────────────────────────────┐
│     Acquiring a second pose of the user at a second preset time point, and        │
│   calculating a second estimated pose of the user at the third preset time point  │── S422
│   based on the second pose, wherein the second preset time point is between the   │
│            first preset time point and the first time point                        │
└─────────────────────────────────────────────────────────────────────────────┘
                                    ↓
┌─────────────────────────────────────────────────────────────────────────────┐
│  At the second preset time point, transforming at least a portion of the first data │
│     based on the first estimated pose and the second estimated pose so that the    │── S424
│  transformed first data corresponds to a pose of the user at the third preset time  │
│                                     point                                          │
└─────────────────────────────────────────────────────────────────────────────┘
                                    ↓
┌─────────────────────────────────────────────────────────────────────────────┐
│   Acquiring a third pose of the user at a fourth preset time point, calculating a  │
│  fourth estimated pose of the user at a fifth preset time point based on the third │── S426
│   pose, wherein the fourth preset time point is between the first time point and   │
│                           the second time point                                    │
└─────────────────────────────────────────────────────────────────────────────┘
                                    ↓
┌─────────────────────────────────────────────────────────────────────────────┐
│    At the fourth preset time point, transforming at least a portion of the second  │
│   data based on the third estimated pose and the fourth estimated pose so that the │── S428
│    transformed second data corresponds to a pose of the user at the fifth preset   │
│                                  time point                                        │
└─────────────────────────────────────────────────────────────────────────────┘
```

FIG. 9A

METHOD FOR REFRESHING SCREEN OF HEAD-MOUNTED DISPLAY DEVICE, AND HEAD-MOUNTED DISPLAY DEVICE

TECHNICAL FIELD

The present disclosure relates to the field of image display technology, and in particular, to a method for refreshing a screen of a head-mounted display device, a head-mounted display device, and a non-transitory computer readable storage medium configured to store computer instructions.

BACKGROUND

With the development of mobile portable devices, interactions between smart terminals and wearable display devices have become more common. A head-mounted display device, such as augmented reality (AR), virtual reality (VR), or mixed reality (MR) glasses, typically has two screens, which correspond to a user's left and right eyes, respectively. The above-mentioned head-mounted display device is usually connected to a smart terminal through a Type-c interface so that the two screens of the head-mounted display device display data transmitted by the smart terminal.

Currently, common screen refreshing methods include two types: roller illumination and global illumination. If a roller illumination refreshing method is used, the two screens of the head-mounted display device need to be refreshed at the same time. Generally, the roller illumination refreshing method is implemented by line-by-line exposure. Start time and end time of display on respective lines of a screen are different, which is liable to cause distortion of displayed images, i.e., a jello effect. If a global illumination refreshing method is used to avoid the jello effect, all pixels of the screen need to be lighted up and turned off at the same time.

Therefore, how to reduce a refresh delay between a smart terminal and a wearable display device has become a technical problem to be solved urgently in the art.

SUMMARY

A method and apparatus for refreshing screens of a head-mounted display device is proposed in embodiments of the present disclosure.

In a first aspect, embodiments of the present disclosure provide a method for refreshing a first screen and a second screen of a head-mounted display device. The first screen and the second screen correspond to two eyes of a user, respectively, when the user wears the head-mounted display device. The method includes: from a first time point to a second time point, sending first data to both the first screen and the second screen, and writing the first data to the first screen, with the first screen configured to be in a black screen state, and the second screen configured to be in a bright screen state for at least part of the time; and from the second time point to a third time point, sending second data to both the first screen and the second screen, and writing the second data to the second screen, with the second screen configured to be in the black screen state, and the first screen configured to be in the bright screen state for at least part of the time to display the first data.

In a second aspect, embodiments of the present disclosure provide an apparatus for refreshing a first screen and a second screen of a head-mounted display device. The first screen and the second screen correspond to two eyes of a user, respectively. The apparatus includes: a data sending unit configured to: from a first time point to a second time point, send first data to both the first screen and the second screen, and write the first data to the first screen, with the first screen configured to be in a black screen state, and the second screen configured to be in a bright screen state for at least part of the time; and from the second time point to a third time point, send second data to both the first screen and the second screen, and write the second data to the second screen, with the second screen configured to be in the black screen state, and the first screen configured to be in the bright screen state for at least part of the time to display the first data.

In a third aspect, embodiments of the present disclosure provide a wearable device including the apparatus for refreshing a first screen and a second screen of a head-mounted display device in the second aspect.

In a fourth aspect, embodiments of the present disclosure provide an electronic device including: one or more processors; and a storage means configured to store one or more programs, wherein the one or more programs, when executed by the one or more processors, cause the one or more processors to implement the method in the first aspect.

In a fifth aspect, embodiments of the present disclosure provide a non-transitory computer readable storage medium configured to store computer instructions, wherein the computer instructions are configured to cause a computer to execute the method in the first aspect.

In a sixth aspect, embodiments of the present disclosure provide a computer program product including computer programs/instructions, wherein the computer programs/instructions, when executed by a processor, implement the method in the first aspect.

BRIEF DESCRIPTION OF THE DRAWINGS

Other features, objectives and advantages of the present disclosure will become more apparent by reading the detailed description of the non-restrictive embodiments with reference to the following drawings:

FIG. 1 is a schematic diagram of an implementation flow of a method for refreshing a first screen and a second screen of a head-mounted display device provided in embodiments of the present disclosure.

FIG. 2 is a schematic diagram of connection between a host device and a head-mounted display device provided in embodiments of the present disclosure.

FIG. 6 is a schematic diagram of another application flow of a method provided in embodiments of the present disclosure in practice.

DETAILED DESCRIPTION

Figure 3:
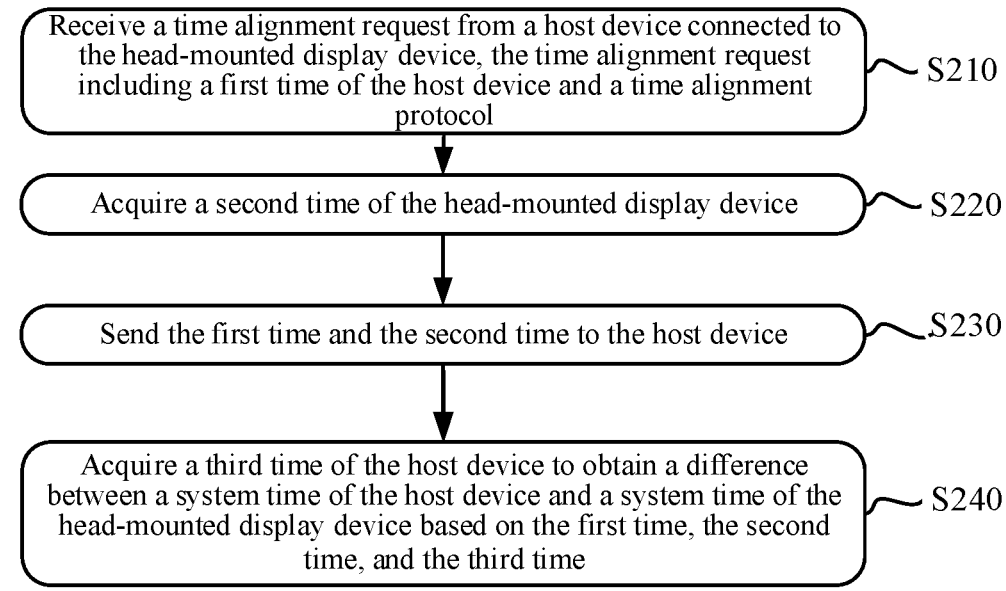
FIG. 3 is a schematic diagram of an implementation flow for time alignment provided in embodiments of the present disclosure.

To make the objectives, technical solutions and advantages of the present disclosure clearer, the technical solutions in the present disclosure will be described clearly and completely in conjunction with specific embodiments of the present disclosure and corresponding accompanying drawings. It may be understood that the specific embodiments described here are only used for explaining the relevant application, rather than limiting the application. In addition, it is also to be noted that, for convenience of description, only parts related to the relevant application are shown in the drawings.

As used herein, the term "includes" and its variants denote open-ended terms, meaning "including but not limited to". The term "based on" means "at least partially based on". The terms "one embodiment" and "an embodiment" denote "at least one embodiment". The term "another embodiment" denotes "at least one other embodiment". The terms "first", "second" and the like may refer to different or same objects. Other definitions can be included below, whether explicitly or implicitly. The definition of a term is consistent throughout the description unless explicitly indicated in the context.

It is to be noted that embodiments in the present disclosure and features in the embodiments can be combined with each other without conflicts. The present disclosure will be described in detail below with reference to the accompanying drawings in conjunction with embodiments.

In order to solve the problem of delay in screen refreshing in related technologies, embodiments of the present disclosure provide a method for refreshing a first screen and a second screen of a head-mounted display device. The first screen and the second screen correspond to two eyes of a user, respectively, when the user wears the head-mounted display device. For example, the first screen corresponds to the user's left eye and the second screen corresponds to the user's right eye, or the first screen corresponds to the user's right eye and the second screen corresponds to the user's left eye. The term "correspond" here means that when the user wears the head-mounted display device, for example, the user's left eye views a displayed content by the first screen, and the user's right eye views the displayed content by the second screen.

It should be noted that the first screen and the second screen exemplified above as screens of the head-mounted display device are only an exemplary illustration of embodiments of the present disclosure, and do not limit embodiments of the present disclosure in any way.

An executor of the method may be any of various types of computing devices, or may be an application program or application (APP) installed on a computing device. The computing device may, for example, be a user terminal such as a cell phone, a tablet computer, or a head-mounted display device, and may also be a server, or the like.

The head-mounted display device may be connected to other device to receive, display or process data from the device, such as data from an application of the device. The device connected to the head-mounted display device may be other terminal such as a cell phone or a computer, and is referred to herein as a host device. The head-mounted display device and the host device may typically be connected via a USB interface to transmit data from the host device to the head-mounted display device. The data described herein includes, but is not limited to, audio data, video data, image data, and the like.

It should be noted that the head-mounted display device may also not be connected to other device. The head-mounted display device may have an element storing the above-described data, which may be transmitted directly between elements in the head-mounted display device.

For example, as shown in FIG. 1, the host device and the head-mounted display device may be connected via a Type-c interface. For example, video data from the host device may be transmitted to a screen control chip of the head-mounted display device via the DisplayPort (DP) protocol. The screen control chip may transmit the video data to the first screen and the second screen by the low voltage differential signaling (LVDS) technology. The screen control chip may also send signals to the first screen and the second screen through lines to control other functions of the screens.

It should be noted that, in general, with the LVDS transmission technology, data needs to be transmitted continuously to screens regardless of states of the screens (displaying an image or being black, etc.). Once the transmission is interrupted, a connection needs to be re-established.

In related technologies, data transmission to a screen usually requires a buffer. A central processing unit (CPU) or graphics processing unit (GPU) needs to generate an image in the buffer in advance, and then a screen control chip acquires the image from the buffer and transmits it to the screens. However, this method is prone to transmission delay. In the present disclosure, in order to reduce the delay, data transmission may be performed without providing a buffer separately. For example, only a small buffer is provided in the screen control chip. Only a few lines of data, but not a full frame of image data, can be cached in the buffer. In other words, image data that can be stored in the buffer is less than a full frame of image data. That is, data transmitted from a host device needs to be transmitted to the screens immediately to reduce the delay.

For example, in a process of transmitting data to a screen and displaying it, the data may be pre-written to the screen, and the screen is controlled to be in a black screen state in the process of witting the data to the screen, and then the screen is illuminated to display the data that has been written thereto.

Typically, a refresh rate supported by a screen of a head-mounted display device is usually 60 Hz, 90 Hz, 120 Hz, 144 Hz, or the like, while an upper limit of image data transmitted by a Type-c interface via a DP protocol is less than 1920*1200*2*120 Hz. Therefore, adopting a related technology, images with high frame rates and high resolutions, such as 1920*1200*2*144, 3840*1200*2*120, or 3840*1200*2*144, cannot be transmitted when the transmission bandwidth is limited. For example, in a case that two screens of a head-mounted display device are refreshed with a refresh rate of 60 Hz, general practice is to refresh image data corresponding to the two screens at the same time by uses of a global illumination mode. A full frame of image data transmitted from the host device to the two screens through the Type-c interface is 3840*1200*60 Hz or 1920*2400*60 Hz, and writing the full frame of image data to the two screens takes 16.666 . . . ms, with a delay time being 16.666 . . . ms with the addition of screen illumination time/2. Since the two screens need to be refreshed at the same time, the delay for each screen is also 16.666 . . . ms with the addition of screen illumination time/2, which is a large refresh delay. In order to reduce the refresh delay, the present disclosure provides a method of refreshing two screens in turn to reduce the refresh delay of each screen. With the above example, still using a screen refresh frequency of 60 Hz as an example, by using the method provided in the present disclosure, writing data to one screen only takes 8.333 . . . ms, that is, the delay time is only 8.333 . . . ms with the addition of screen illumination time/2, which can reduce the refresh delay of each screen as compared with related technologies.

A method for refreshing a first screen and a second screen of a display device of the present disclosure will be described specifically below.

In an embodiment, an implementation process of this method provided in embodiments of the present disclosure, as shown in FIG. 2, includes:

S110, from a first time point to a second time point, sending first data to both the first screen and the second screen, and writing the first data to the first screen, with the first screen configured to be in a black screen state, and the second screen configured to be in a bright screen state for at least part of the time; and S120, from the second time point to a third time point, sending second data to both the first screen and the second screen, and writing the second data to the second screen, with the second screen configured to be in the black screen state, and the first screen configured to be in the bright screen state for at least part of the time to display the first data.

The first data and the second data may include image data for refreshing the first screen and the second screen. In embodiments of the present disclosure, the first data and the second data may, for example, be image data sent by a host device connected to the head-mounted display device.

The "black screen state" in the present disclosure means that the screen does not display any content; for example, the screen may not display image data. The screen may appear black, for example. The "bright screen state" in the present disclosure refers to a state in which the screen lights up and displays data that has been written. For the time interval from the first time point to the second time point or from the second time point to the third time point, the screen may be always in the bright screen state, or may be in the bright screen state for part of the time and in the black screen state for part of the time. In the present disclosure, when data is being written into the screen, the screen may be controlled to be in the black screen state. During the time interval from the first time point to the second time point or from the second time point to the third time point, the screen may display the data that has been written thereto, when the screen is controlled to be in the bright screen state. It should be noted that if during the time interval from the first time point to the second time point or from the second time point to the third time point, the screen is controlled to be in the bright screen state for part of the time and in the black screen state for part of the time, then during the time interval, data transmitted at that time is not written to the screen even if the screen is in the black screen state for part of the time.

Optionally, the first screen and the second screen may be controlled to be in the black screen state or the bright screen state by sending a signal to the first screen and the second screen. For example, a screen control chip sends a signal continuously to the first screen and the second screen. It may send a first signal continuously to the first screen and the second screen between the first time point and the second time point. The first signal indicates that the first screen is in the black screen state and the second screen is in the bright screen state. For example, a screen control chip sends a signal at intervals to the first screen and the second screen. It may send a second signal to the first screen and the second screen at the first time point. The second signal indicates that the first screen is in the black screen state and the second screen is in the bright screen state between the first time point and the second time point. At the third time point, the fourth time point . . . up to an nth time point, the above mentioned two ways may be adopted to send a signal to the screens to control the states of the screens. It is also possible that a screen control chip sends a third signal to the first screen and the second screen at an initial time point, such as the first time point. The third signal indicates that the first screen and the second screen are in the bright screen state or the black screen state in preset periods (e.g., time intervals divided between the first time point, the second time point, the third time point . . . up to the nth time point as described above).

Optionally, the first screen and the second screen are set to be in the black screen state or the bright screen state according to a preset cycle. For example, the first screen and the second screen may be set to be in the bright screen state or the black screen state according to time intervals divided by the first time point, the second time point, the third time point . . . up to the nth time point without a signal sending to the first screen and the second screen.

In an embodiment, the first time point may be an initial time point, and may be a time point when a first vertical synchronization signal of the first screen and the second screen is obtained, at which time none of the first screen and the second screen may have begun displaying an image. Between the first time point and the second time point, a screen control chip sends the first data to both the first screen and the second screen, and during this time interval, the first data may be written to the first screen, and the first screen is configured to be in the black screen state, and the second screen is configured to be in the bright screen state for at least part of the time. In the case where the first time point is an initial time point, since no data was transmitted and written to the first screen or the second screen before that time point, although the second screen is bright for at least part of the time, no image data is displayed on the second screen during that part of the time. Between the second time point and the third time point, the screen control chip sends the second data to both the first screen and the second screen, and during this time interval, the second data may be written to the second screen, and the second screen is configured to be in the black screen state, and the first screen is configured to be in the bright screen state for at least part of the time to display the first data. Moreover, since the first data was written to the first screen during the time interval between the first time point and the second time point, therefore during the time interval between the second time point and the third time point, the first screen may be configured to be in the bright screen state to display the first data. It may be appreciated that if the first time point is not an initial time point and data has been written to the second screen, then between the first time point and the second time point, the second screen may be in the bright screen state for at least part of the time and display the data that was written thereto previously.

Using the above method provided in embodiments of the present disclosure, although data is transmitted to both screens all the time, however, during any time interval, data may be written to only one screen A thereof, and the screen A is controlled to be in the black screen state, and the other screen B is controlled to be in the bright screen state for at least part of the time to display data (if any) that have been written thereto during the time interval immediately previous to that time interval. During the next time interval, data may be written to only the screen B, and the screen B is controlled to be in the black screen state, and the screen A is controlled to be in the bright screen state for at least part of the time to display the data that have been written thereto during the time interval immediately previous to that time interval. That is, the two screens are refreshed in turn, such that data may be written to the two screens alternately and displayed on the two screens alternately, so the refresh delay of each screen may be reduced.

In an optional implementation, the time interval between the first time point and the second time point may be equal to the time interval between the second time point and the third time point. For example, if each of the above-mentioned time points is a time point at which a vertical synchronization signal is obtained, the time interval between any two vertical synchronization signals is same. In this way, the amount of time to write data to respective screen is equal, which facilitates data transmission to the head-mounted display device.

In an optional implementation, to avoid "tearing" of the display, frames per second (FPS) of images may be synchronized with a refresh rate of the screens. In this case, the first time point, the second time point, and the third time point may be time points of acquiring vertical synchronization (Vsync) signals of the first screen and the second screen of the head-mounted display device; or the first time point and the third time point may be time points of acquiring Vsync signals of the first screen and the second screen of the head-mounted display device, and the second time point may be a time point between the time points of acquiring two Vsync signals, such as an intermediate time point between the time points of acquiring two Vsync signals. It may be understood that at least one of the first time point, the second time point, and the third time point is a time point of acquiring a vertical synchronization signal of the first screen and the second screen.

For example, as shown in FIG. 1, at a time point when a micro control unit (MCU) of the head-mounted display device acquires a Vsync signal, the Vsync signal is used to indicate the end of a previous frame of data and the start of a following frame of data. In order to get an accurate time stamp, for example, a time stamp of Vsync of the screens (Vsync of a DP of the head-mounted display device) may be transmitted by the MCU to the host device. For example, the head-mounted display device is connected to the host device via a Type-c interface to display data from an App in the host device. With authorization of the host device, the App of the host device may acquire Vsync of the screens of the head-mounted display device through the host device. Without authorization of the host device, the App of the host device needs to acquire Vsync of the screens through the MCU. Then system time of the head-mounted display device needs to be aligned with system time of the host device by a system time alignment method, and a current refresh state of the screen may be obtained thereby, for example, subsequently which screen needs writing data and which screen needs to be controlled in the bright screen state.

In an optional implementation, as shown in FIG. 3, before sending first data to both the first screen and the second screen, and writing the first data to the first screen, with the first screen configured to be in a black screen state, and the second screen configured to be in a bright screen state for at least part of the time, and/or before sending second data to both the first screen and the second screen, and writing the second data to the second screen, with the second screen configured to be in the black screen state, and the first screen configured to be in the bright screen state for at least part of the time to display the first data, the method for refreshing screens of the present disclosure further includes:

S210, receiving a time alignment request from a host device connected to the head-mounted display device, the time alignment request including a first time of the host device and a time alignment protocol;

S220, acquiring a second time of the head-mounted display device;

S230, sending the first time and the second time to the host device; and

S240, acquiring a third time of the host device to obtain a difference between a system time of the host device and a system time of the head-mounted display device based on the first time, the second time, and the third time.

Using the time alignment method provided in embodiments of the present disclosure, a time deviation between the host device connected to the head-mounted display device and the head-mounted display device may be calibrated to ensure the accuracy of data transmission.

For example, the head-mounted display device is connected to the host device through a Type-c interface. When the host device sends a time alignment request, it transmits a system time $t_{h1}$ of the host device and a time alignment protocol to the MCU through a USB protocol. After the MCU receives the time alignment protocol, it immediately obtains a system time $t_{g1}$ of the MCU, and sends $t_{h1}$ and $t_{g1}$ together back to the host device. After the host device receives a time alignment protocol response from MCU, it immediately acquires a system time $t_{h2}$ of the host device. $t_{h1}$-$t_{g1}$ contains a difference delta_t between the system time of the host device and the system time of the head-mounted display device, and a time t_usb of transmission via USB. Then delta_t may be obtained by the following calculations.

$$t_{h1} - t_{g1} = \text{delta\_t} - \text{t\_usb}$$

$$t_{h2} - t_{g1} = \text{delta\_t} + \text{t\_usb}$$

$$\text{delta\_t} = (t_{h1} - t_{g1} + t_{h2} - t_{g1})/2$$

Optionally, the time alignment protocol may be executed at regular time intervals, and a weighted mean of values of delta_t obtained every time is calculated to obtain filtered delta_t, so that delta_t variations are smoother and delta_t variations due to a frequency deviation between the two systems may also be dealt with.

Optionally, the first data may include a first full frame of data, and the second data may include a second full frame of data. The first full frame of data and the second full frame of data may be configured as same image data; or the first full frame of data may be configured as left eye image data and the second full frame of data may be configured as right eye image data. The term "full frame of data" in the present disclosure refers to data of a frame of complete image.

Optionally, each of the first data and the second data may also include partial data of a full frame of data. For example, the first data includes a first portion of data of a third full frame of data, and the second data includes a second portion of data of the third full frame of data, wherein the first portion of data and the second portion of data constitute the third full frame of data. Using the first data as an example, the first data may include a portion of data of a frame of complete image, such as one half, one third, or one fourth of the data. Conversely, the second data may include the remaining one half, two thirds, or three quarters of the data of the frame of complete image, so that the first data and the second data constitute the frame of complete image. It may be appreciated that in the case where each of the first data and the second data is not one half of data of a full frame of data, the time intervals between the first time point, the second time point and the third time point need to be adjusted accordingly.

Figure 4:
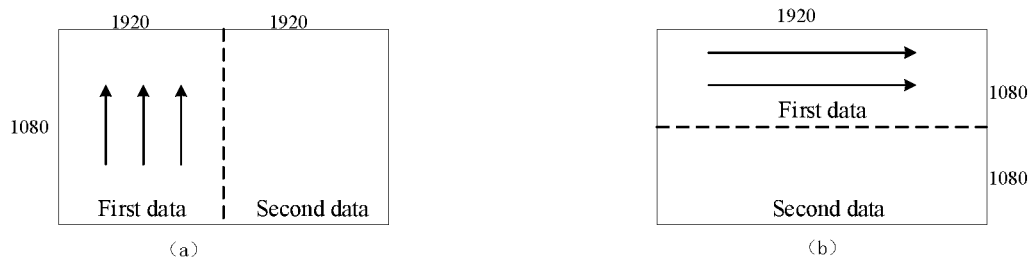
FIG. 4 is schematic diagram of first data and second data provided in embodiments of the present disclosure.

FIG. 4 shows, in (a) and (b), a schematic diagram of first data and second data provided in embodiments of the present disclosure. As shown in (a) of FIG. 4, using a third full frame of image data of 1920*1080 as an example, the first data may include a left half of data of the third full frame of data, and the second data may include a right half of data of the third full frame of data. Alternatively, as shown in (b) of FIG. 4, the first data may include an upper half of data of the third full frame of data, and the second data may include a lower half of data of the third full frame of data.

In an example, the first data and the second data are configured as same image data, and a user can only view a picture with a two-dimensional display effect when wearing the head-mounted display device.

In another example, the first data and the second data may be configured as different image data. For example, a first full frame of data is configured as left eye image data, and a second full frame of data is configured as right eye image data. It is to be noted that the "left eye image data" mentioned in the present disclosure refers to data configured to be transmitted to a screen (e.g., a first screen) corresponding to the user's left eye, so that when the user wears the head-mounted display device, the user's left eye views the left eye image data by the first screen, and vice versa for the "right eye image data". Optionally, the left eye image data and the right eye image data may be configured as image data with parallax to achieve a stereoscopic display effect. When the user wears the head-mounted display device, he or she can view a picture with a three-dimensional display effect.

It should be noted that due to spacing between a person's left and right eyes, there is a slight difference in viewing angles of the two eyes, and such a difference results in a displacement between scenes observed by the two eyes respectively. Thus, a stereoscopic visual effect with a spatial sense to the person can be produced. Therefore, the above expression that "the left eye image data and the right eye image data are configured as image data with parallax" may be understood to mean that the parallax between the left eye image data and the right eye image data can produce a stereoscopic visual effect after viewing by both eyes of the user.

It should be noted that if the first data is configured as left eye image data and the second data is configured as right eye image data, i.e., the first data and the second data are configured as different data, but there is no parallax between the left eye image data and the right eye image, then a two-dimensional display effect can still be achieved when the method is adopted. For example, the first data and the second data may be different in areas where visual fields of the right and left eyes overlap.

Figure 5:
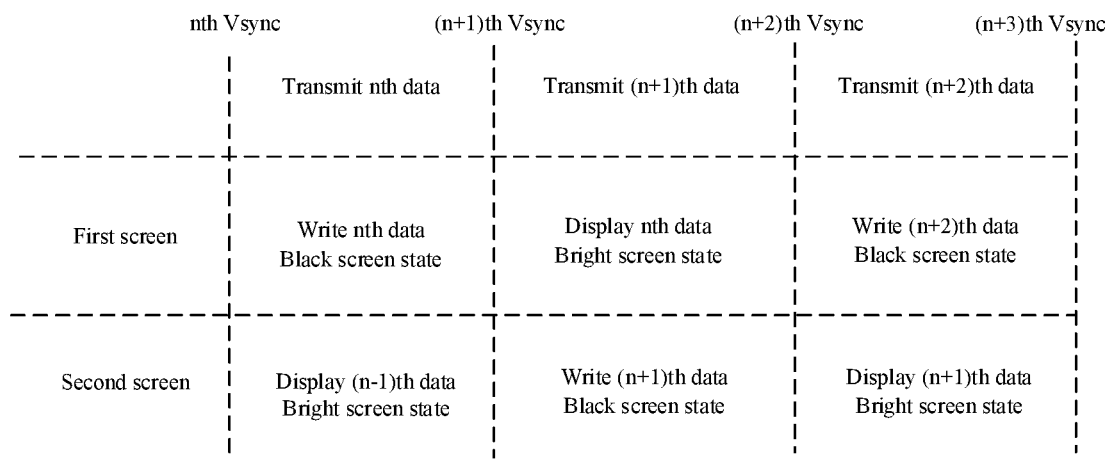
FIG. 5 is a schematic diagram of an application flow of a method provided in embodiments of the present disclosure in practice.

FIG. 5 illustrates an embodiment of a method for refreshing screens of the present disclosure.

In this embodiment, during the time interval between acquiring an nth Vsync signal and acquiring an (n+1)th Vsync signal, nth data may be sent to both the first screen and the second screen, and the nth data is written to the first screen, with the first screen configured to be in a black screen state, and the second screen configured to be in a bright screen state for at least part of the time. When the second screen is configured to be in the bright screen state, it may display data that was written thereto previously.

In the present disclosure, n may denote a positive integer such as 1, 2, 3 . . . , etc. When n denotes 1, it may be understood as an initial state. It should be noted that since no data was written to the second screen before a 1st Vsync signal is acquired, thus during the time interval between acquiring the 1st Vsync signal and acquiring a 2nd Vsync signal, the second screen does not display data, although the second screen is in the bright screen state for at least part of the time.

During the time interval between acquiring the (n+1)th Vsync signal and acquiring an (n+2)th Vsync signal, (n+1)th data may be sent to both the first screen and the second screen, and the (n+1)th data is written to the second screen, with the second screen configured to be in the black screen state, and the first screen configured to be in the bright screen state for at least part of the time, wherein the first screen, when configured to be in the bright screen state, may display nth data that has been written thereto. During a subsequent time interval between acquiring any two Vsync signals, the process is repeated to perform operations of transmitting data continuously, writing data in turn and displaying data in turn. For explanation about the nth data and the (n+1)th data, reference may be made to the above explanation about the first data and the second data. For example, each of the nth data and the (n+1)th data may be a full frame of data.

FIG. 6 illustrates an embodiment of a method for refreshing screens of the present disclosure.

In this embodiment, during the time interval between acquiring an nth Vsync signal and acquiring an (n+1)th Vsync signal, nth data may be sent to both the first screen and the second screen. Any time point after acquiring the nth Vsync signal and before acquiring the (n+1)th Vsync signal may serve as a demarcation point, such as an intermediate time point in the time interval between acquiring the two Vsync signals. For example, if the time point of acquiring the nth Vsync signal is $T_n$ and the time point of acquiring the (n+1)th Vsync signal is $T_{n+1}$, then the above-mentioned intermediate time point may be $T_n+\frac{1}{2}(T_{n+1}-T_n)$. During the time interval between the acquisition of the nth Vsync signal and the above-mentioned intermediate time point, a first portion of data of the nth data may be written to the first screen, with the first screen configured to be in the black screen state, and the second screen configured to be in the bright screen state for at least part of the time. In a case that the second screen is configured to be in the bright screen state, it may display data that was written thereto previously.

During the time interval between the above-mentioned intermediate time point and the acquisition of the (n+1)th Vsync signal, a second portion of data of the nth data may be written to the second screen, with the second screen configured to be in the black screen state, and the first screen configured to be in the bright screen state for at least part of the time. In a case that the first screen is configured to be in the bright screen state, it may display the first portion of data of the nth data that has been written thereto. During a subsequent time interval between acquiring any two Vsync signals, the process is repeated to perform operations of transmitting data continuously, writing data in turn and displaying data in turn. For explanation about the first portion of data of the nth data and the second portion of data of the nth data, reference may be made to the above explanation about the first data and the second data. For example, the first portion of data of the nth data may be one half of data of the full frame of data, the second portion of data of the nth data may be the remaining one half of data of the full frame of data, and the first portion of data and the second portion of data constitute the full frame of data.

In order to reduce the judder and latency problems of display, asynchronous timewarp (ATW) technology may be used in embodiments of the present disclosure.

A "pose" referred to in the following embodiments of the present disclosure may refer to a position and attitude of a user. For example, it may be a pose related to 6 degrees of freedom (6dof) of the user. In the present disclosure, for example, motion data fed back from motion sensors, such as an acceleration sensor, a gyroscope, and the like, may be analyzed to obtain the user's real pose, such as position, direction of motion, speed, acceleration, and the like, at a preset time point.

In an estimation operation in the following embodiments, an estimated pose of the user at a preset time point may be calculated based on an acquired real pose of the user, or based on an acquired real pose of the user and further on historical data of real poses of the user. In a data shift operation in the following embodiments, data shift may be performed based on a difference between different estimated poses. For example, all of rendered data may be shifted, or a portion of the rendered data may be shifted. The shifted data may correspond to the user's pose at a preset time point. The preset time point here refers to a time point when the screen displays data that has been written. The user's pose at that time point corresponds to an image displayed by the screen at that time point, which avoids the problem of display delay. It may be appreciated that marked positions of the "preset time point" in the accompanying drawings related to the following embodiments are only exemplary. The preset time point is specifically be a time point that may be selected according to a specific solution, and the marked positions in the drawings are not specific limitations of the "preset time point".

Optionally, in the following embodiments, data may be rendered in a time interval between a first preset time point and a second preset time point. For example, the second preset time point may be a time point when the rendering of the data is completed, or it may be a time point a period of time after the rendering is completed.

Optionally, an ATW operation may be performed at the host device, and shifted data may be transmitted to the head-mounted display device.

FIG. 7A shows a method for reducing a display delay of image data based on asynchronous timewarp provided in embodiments of the present disclosure.

S402, acquiring a first pose of the user at a first preset time point, and calculating a first estimated pose of the user at a third preset time point based on the first pose of the user, wherein the first preset time point is prior to the first time point, and the third preset time point is between the second time point and the third time point.

S404, acquiring a second pose of the user at a second preset time point, and calculating a second estimated pose of the user at the third preset time point based on the second pose of the user, wherein the second preset time point is between the first preset time point and the first time point.

S406, at the second preset time point, shifting at least a portion of the first data based on the first estimated pose and the second estimated pose, such that the shifted first data corresponds to a pose of the user at the third preset time point.

Figure 7C:
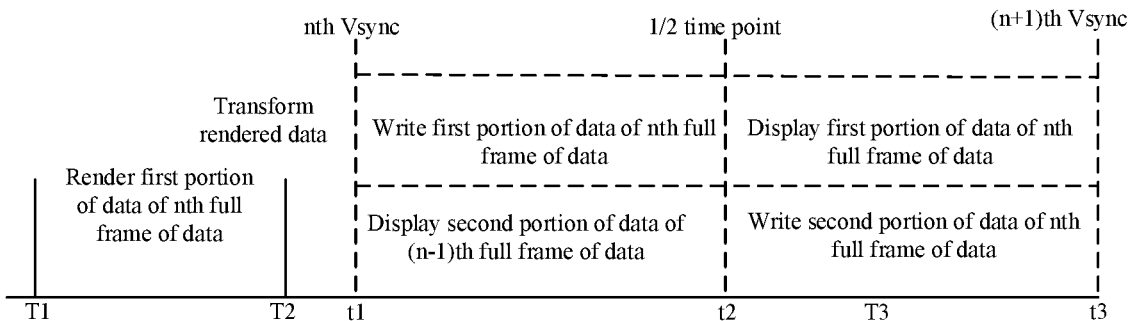
FIGS. 7A to 9C are schematic diagrams of implementation flows of a method for reducing a display delay of image data based on asynchronous timewarp provided in embodiments of the present disclosure.

As in embodiments of FIGS. 7B and 7C, the first preset time point T1 and the second preset time point T2 are prior to the first time point t1, and the third preset time point T3 is between the second time point t2 and the third time point t3, and is a time point for displaying data that has been written.

In the embodiment shown in FIG. 7B, for example, the first data includes a first full frame of data (e.g., an nth full frame of data in FIG. 7B). Before the first time point t1 of transmitting the nth full frame of data, the nth full frame of data may be rendered between the first preset time point and the second preset time point, a first pose of the user at the first preset time point T1 is acquired, and a first estimated pose of the user at the third preset time point T3 is calculated based on the first pose. A second pose of the user at the second preset time point T2 is acquired, and a second estimated pose of the user at the third preset time point T3 is calculated based on the second pose. At the second preset time point T2, at least a portion of the nth full frame of data is shifted based on the first estimated pose and the second estimated pose, so that the shifted nth full frame of data corresponds to a pose of the user at the third preset time point T3. For other explanation about this embodiment, reference may be made to the explanation about the embodiment of FIG. 5.

In the embodiment shown in FIG. 7C, for example, the first data may include a first portion of data of a third full frame of data (e.g., an nth full frame of data in FIG. 7C), and before the first time point t1 of transmitting the first portion of data of the nth full frame of data, the first portion of data of the nth full frame of data may be rendered between the first preset time point and the second preset time point, a first pose of the user at the first preset time point T1 is acquired, and a first estimated pose of the user at the third preset time point T3 is calculated based on the first pose. A second pose of the user at the second preset time point T2 is acquired, and a second estimated pose of the user at the third preset time point T3 is calculated based on the second pose. At the second preset time point T2, the first portion of the data of the nth full frame of data is shifted based on the first estimated pose and the second estimated pose so that the shifted first data corresponds to a pose of the user at the third preset time point T3. For other explanation about this embodiment, reference may be made to the explanation about the embodiment of FIG. 6.

It may be appreciated that the method shown in this embodiment may similarly be used to perform rendering and shifting operations on the second data, and time points of performing the various operations may similarly be derived according to the above embodiments. For example, the second data may be rendered between two preset time points prior to the second time point t2, an estimated pose of the user at a estimated time point of displaying the second data may be calculated from poses of the user acquired at the two preset time points, and then at least a portion of the second data may be shifted before the second time point t2. In summary, in this embodiment, for the first data and the second data, operations of separate rendering and separate shift are performed before the corresponding data is transmitted. This method achieves that when viewed through each screen by the user, the displayed data all corresponds to the user's pose at the time of displaying the data.

Figure 8A:
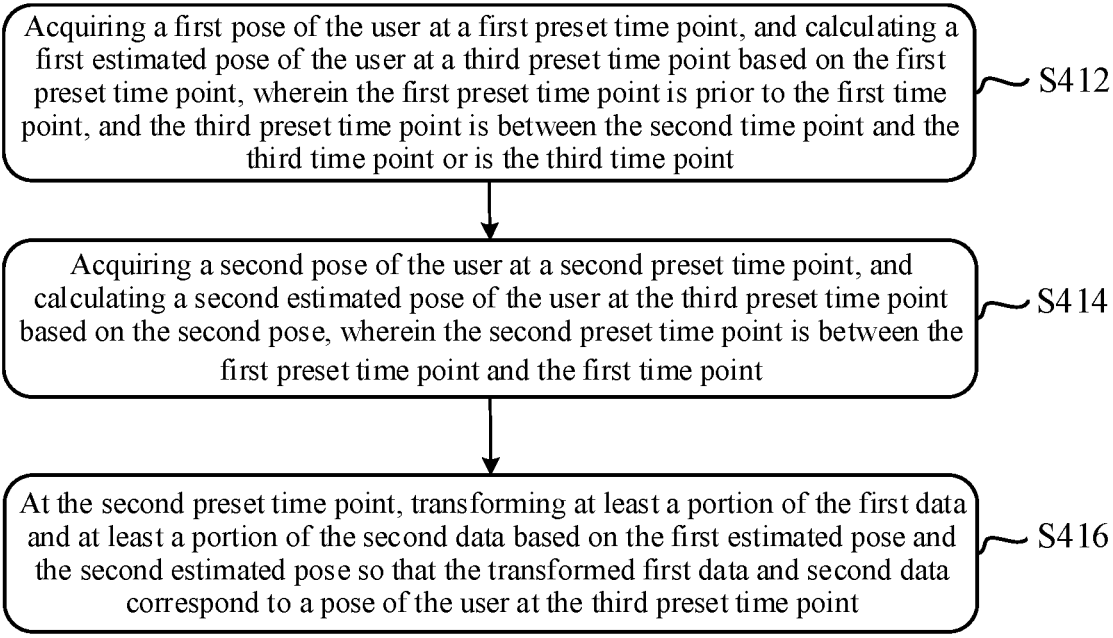

FIG. 8A illustrates another optional implementation.

S412, acquiring a first pose of the user at a first preset time point, and calculating a first estimated pose of the user at a third preset time point based on the first pose of the user, wherein the first preset time point is prior to the first time point, and the third preset time point is between the second time point and the third time point or is the third time point.

S414, acquiring a second pose of the user at a second preset time point, and calculating a second estimated pose of the user at the third preset time point based on the second pose, wherein the second preset time point is between the first preset time point and the first time point; and S416, at the second preset time point, shifting at least a portion of the first data and at least a portion of the second data based on the first estimated pose and the second estimated pose so that the shifted first data and second data correspond to a pose of the user at the third preset time point.

Figure 8B:
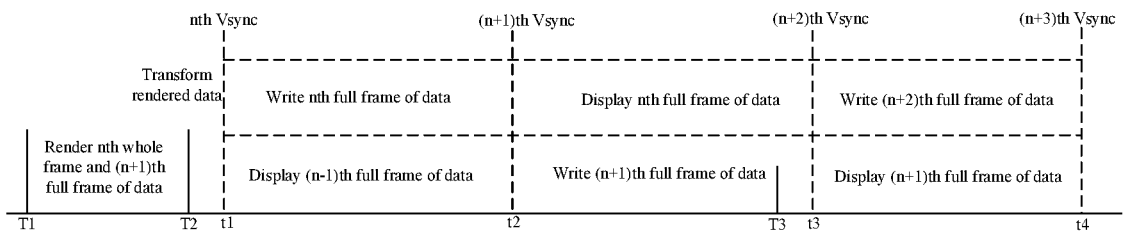

The embodiment shown in FIG. 8B differs from the embodiment shown in FIG. 7B mainly in that a nth full frame of data and an (n+1)th full frame of data are rendered between the first preset time point T1 and the second preset time point T2. The data corresponding to both screens are rendered before the first time point t1, and the nth full frame of data and the (n+1)th full frame of data are shifted before the first time point t1. Since the present method calculates an estimated pose of the user at a data display time point based on poses of the user acquired at the first preset time point T1 and the second preset time point T2, thus, in order to take into account both time points of displaying the nth full frame of data and the (n+1)th full frame of data, the third preset time point T3 is closer to the third time point t3, or may even be the third time point t3, to take into account the two time points mentioned above.

The embodiment shown in FIG. 8C differs from the embodiment shown in FIG. 7C mainly in that an nth full frame of data is rendered between the first preset time point T1 and the second preset time point T2, data corresponding to both screens are rendered before the first time point t1, and the nth full frame of data is shifted by the first time point t1. For other description about this embodiment, reference may be made to the description of the embodiment of FIG. 8B described above, which will not be repeated herein.

It may be appreciated that in the method shown in this embodiment, rendering and shifting operations on the first data and the second data are performed before the first time point t1. An estimated pose of the user at a data display time point (third preset time point T3) is calculated based on poses of the user acquired at the first preset time point T1 and the second preset time point T2. Taking into account the time point of displaying the first data and the time point of displaying the second data, the third preset time point T3 is closer to the third time point t3, or may even be the third time point t3. In summary, in the embodiment shown in FIG. 8A, a method is adopted, in which the data to be displayed on both screens are rendered and shifted together, and this method is simple to operate.

FIG. 9A illustrates yet another optional implementation.

From the third time point to a fourth time point, the first screen is configured to be in the black screen state, and the second screen is configured to be in the bright screen state for at least part of the time to display the second data.

S420, acquiring a first pose of the user at a first preset time point, calculating a first estimated pose of the user at a third preset time point and a third estimated pose of the user at a fifth preset time point based on the first pose, wherein the first preset time point is prior to the first time point, the third preset time point is between the second time point and the third time point, and the fifth preset time point is between the third time point and the fourth time point.

S422, acquiring a second pose of the user at a second preset time point, and calculating a second estimated pose of the user at the third preset time point based on the second pose, wherein the second preset time point is between the first preset time point and the first time point;

S424, at the second preset time point, shifting at least a portion of the first data based on the first estimated pose and the second estimated pose, so that the shifted first data corresponds to a pose of the user at the third preset time point.

S426, acquiring a third pose of the user at a fourth preset time point, calculating a fourth estimated pose of the user at a fifth preset time point based on the third pose, wherein the fourth preset time point is between the first time point and the second time point; and S428, at the fourth preset time point, shifting at least a portion of the second data based on the third estimated pose and the fourth estimated pose, so that the shifted second data corresponds to a pose of the user at the fifth preset time point.

It may be appreciated that in the time interval between the third time point and the fourth time point, the next cycle of transmitting data, writing data and displaying data will be carried out. The third and fourth time points may be understood with reference to the description of the first and second time points.

Figure 9B:
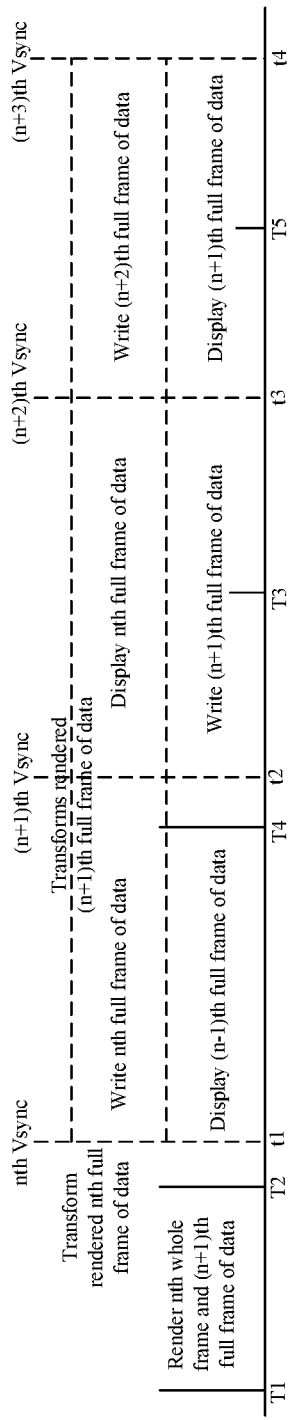

In the embodiment shown in FIG. 9B, the first data includes a first full frame of data (e.g., an nth full frame of data shown in FIG. 9B), and the second data includes a second full frame of data (e.g., an (n+1)th full frame of data shown in FIG. 9B), and before the first time point t1 of transmitting the nth full frame of data, the nth full frame of data and the (n+1)th full frame of data may be rendered together between the first preset time point and the second preset time point. A first pose of the user at a first preset time point T1 is acquired, and a first estimated pose of the user at a third preset time point T3 and a third estimated pose of the user at a fifth preset time point T5 are calculated based on the first pose. Here, the third preset time point T3 is a time point when the nth full frame of data is displayed, between the second time point t2 and the third time point t3, and the fifth preset time point T5 is a time point when the (n+1)th full frame of data is displayed, between the third time point t3 and the fourth time point t4. After the nth full frame of data and the (n+1)th full frame of data are rendered together, a second pose of the user at a second preset time point T2 is acquired, a second estimated pose of the user at a third preset time point T3 is calculated based on the second pose, and at the second preset time point T2 (prior to the first time point t1 of transmitting the nth full frame of data), at least a portion of the nth full frame of data is shifted based on the first estimated pose and the second estimated pose, so that the shifted nth full frame of data corresponds to a pose of the user at the third preset time point T3. A third pose of the user at a fourth preset time point T4 between the first time point t1 and the second time point t2 is acquired, and a fourth estimated pose of the user at the fifth preset time point T5 is calculated based on the third pose. At the fourth preset time point T4 (before the second time point t2 of transmitting the (n+1)th full frame of data), at least a portion of the (n+1)th full frame of data is shifted based on the third estimated pose and the fourth estimated pose, so that the shifted (n+1)th full frame of data corresponds to a pose of the user at the fifth preset time point. For other explanation about this embodiment, reference may be made to the explanation about the embodiment of FIG. 5.

Figure 9C:
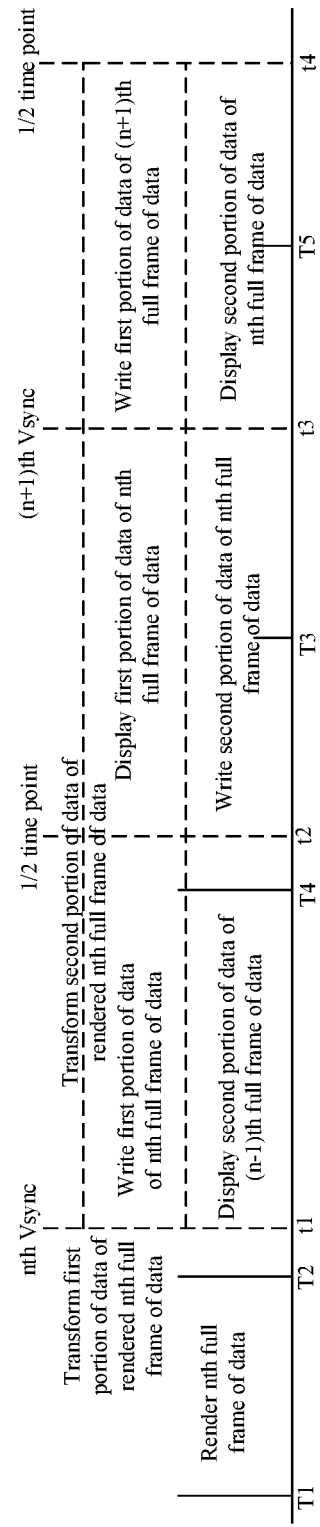

In the embodiment shown in FIG. 9C, the first data may include a first portion of data of a third full frame of data (e.g., an nth full frame of data shown in FIG. 9C), and the second data may include a second portion of data of the third full frame of data (e.g., the nth full frame of data shown in FIG. 9C), and the first portion of data and the second portion of data constitute the third full frame of data. Before the first time point t1 of transmitting the first portion of data of the nth full frame of data, the nth full frame of data may be rendered between the first preset time point and the second preset time point. Before the first time point t1 of transmitting the first portion of data of the nth full frame of data, the first portion of data of the nth full frame of data is shifted, and before the second time point t2 of transmitting the second portion of data of the nth full frame of data, the second portion of data of the nth full frame of data is shifted. For other description about this embodiment, reference may be made to the description of the embodiment shown in FIG. 9B. For other explanation about this embodiment, reference may be made to the explanation about the embodiment of FIG. 6. It may be appreciated that the second time point in this embodiment may be understood as an intermediate time point between two Vsync signals.

It may be appreciated that in the method shown in this embodiment, the first data and the second data are rendered together before the first time point t1, but a shift operation on the first data is carried out before the time point of transmitting the first data and a shift operation on the second data is carried out before the time point of transmitting the second data, and the shift operation is performed based on the user's estimated pose at the time point of displaying the corresponding data. This method is simple in the rendering operation and achieves that when viewed through each screen by the user, the displayed data all corresponds to the user's pose at the time of displaying the data.

In the above-described ways provided in embodiments of the present disclosure, image data to be rendered may be predicted based on asynchronous timewarp technology, and in the case of a change in the user's pose at a time point to display data, at least a portion of data of the first data and/or the second data may be changed in real time based on the change in the user's pose so that the changed first data and/or second data match the changed pose, so a delay may be reduced.

In an example, the present disclosure also provides a method for refreshing a first screen and a second screen of a head-mounted display device. When a user wears the head-mounted display device, an image displayed by the first screen falls in a visual scope of one eye of the user, and an image displayed by the second screen falls in a visual scope of the other eye of the user. The method includes: from a first time point to a second time point, sending first image data to both the first screen and the second screen, and writing the first image data to the first screen to configure the first screen not to display image data, and the second screen to display image data that has been written thereto; and from the second time point to a third time point, sending second image data to both the first screen and the second screen, and writing the second image data to the second screen to configure the second screen not to display image data, and the first screen to display the first image data that has been written thereto, wherein at least one of the first time point, the second time point, and the third time point is a time point of acquiring a vertical synchronization signal of the first screen and the second screen.

Figure 10:
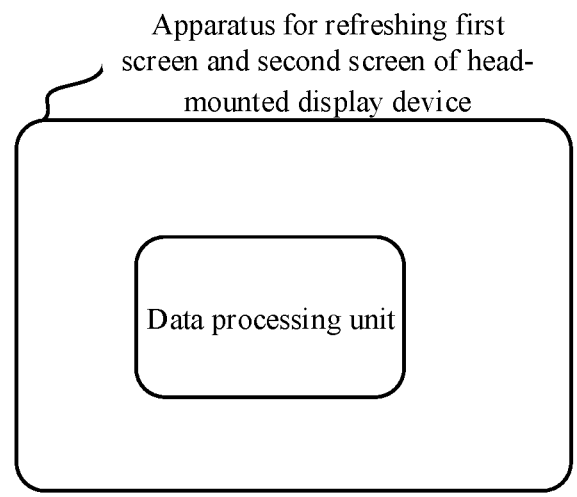
FIG. 10 is a schematic diagram of a specific structure of an apparatus for refreshing a first screen and a second screen of a head-mounted display device provided in embodiments of the present disclosure.

Embodiments of the present disclosure also provide an apparatus for refreshing a first screen and a second screen of a head-mounted display device. The specific structure of the apparatus is schematically shown in FIG. 10. The apparatus includes a data sending unit configured to: from a first time point to a second time point, send first data to both the first screen and the second screen, and write the first data to the first screen, with the first screen configured to be in a black screen state, and the second screen configured to be in a bright screen state for at least part of the time; and from the second time point to a third time point, send second data to both the first screen and the second screen, and write the second data to the second screen, with the second screen configured to be in the black screen state, and the first screen configured to be in the bright screen state for at least part of the time to display the first data.

Using the apparatus provided in embodiments of the present disclosure, the first screen and the second screen can be controlled to be refreshed in turns in different periods of time, such that the refresh delays of the individual screens can be reduced, thereby reducing the refresh delay between the smart terminal and the wearable display device.

Figure 11:
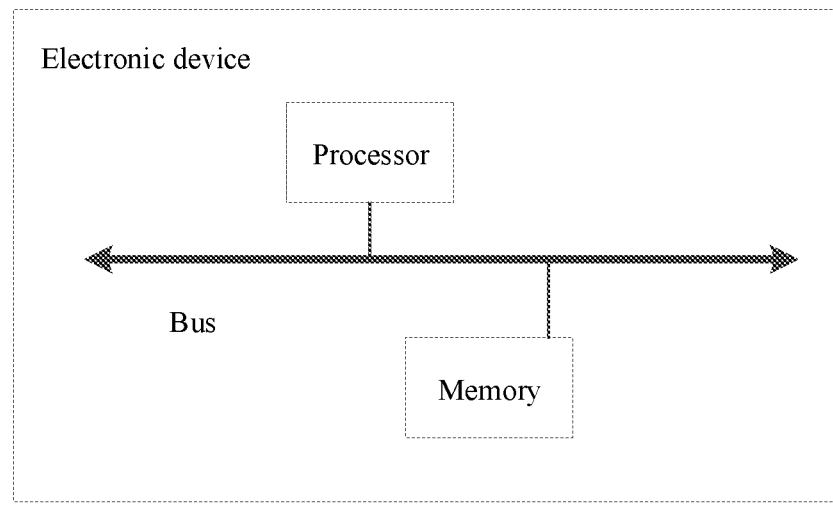
FIG. 11 is a schematic diagram of a specific structure of an electronic device for refreshing a first screen and a second screen of a head-mounted display device provided in embodiments of the present disclosure.

Embodiments of the present disclosure relate to an electronic device, as shown in FIG. 11. In a hardware aspect, the electronic device includes a processor, and optionally further includes an internal bus, a network interface, and a memory. The memory may include an internal storage, such as a high-speed random-access memory (RAM), and may also include a nonvolatile memory, such as at least one disk memory. Of course, the electronic device may also include hardware needed for other services.

The processor, the network interface, and the memory may be interconnected by the internal bus. The internal bus may be an ISA (Industry Standard Architecture) bus, a PCI (Peripheral Component Interconnect) bus, an EISA (Extended Industry Standard Architecture) bus, or the like. The bus may be divided into an address bus, a data bus, a control bus, etc. For ease of representation, the bus is represented by only one bidirectional arrow in FIG. 11, but it does not mean that there is only one bus or one type of bus.

The memory is configured to store computer programs. Specifically, the programs may include program codes, which include computer operating instructions. The memory may include an internal storage and a non-volatile memory, and provides instructions and data to the processor.

The processor reads a corresponding computer program from the non-volatile memory into the internal storage and then runs it, forming, at a logical level, a method apparatus for refreshing a first screen and a second screen of a head-mounted display device. The processor executes the programs stored in the memory and is specifically configured to perform the following operations:

from a first time point to a second time point, sending first data to both the first screen and the second screen, and writing the first data to the first screen, with the first screen configured to be in a black screen state, and the second screen configured to be in a bright screen state for at least part of the time; and from the second time point to a third time point, sending second data to both the first screen and the second screen, and writing the second data to the second screen, with the second screen configured to be in the black screen state, and the first screen configured to be in the bright screen state for at least part of the time to display the first data.

The above-described method for refreshing a first screen and a second screen of a head-mounted display device as provided in this specification may be applied to, or implemented by, a processor. The processor may be an integrated circuit chip with signal processing capability. During implementation, the steps of the above-mentioned method may be accomplished by an integrated logic circuit in the form of hardware or instructions in the form of software in the processor. The above-mentioned processor may be a general-purpose processor, including a central processing unit (CPU), a network processor (NP), or the like; and may also be a digital signal processor (DSP), an application specific integrated circuit (ASIC), a field-programmable gate array (FPGA) or other programmable logic device, a discrete gate or transistor logic device, or a discrete hardware component. The various methods, steps and logical block diagrams disclosed in embodiments of this specification may be implemented or executed. The general-purpose processor may be a microprocessor, or the processor may also be any conventional processor or the like.

The steps of the methods disclosed in conjunction with embodiments of this specification may be directly embodied in hardware and executed by a decoding processor, or executed by a combination of hardware and software modules in a decoding processor. The software module may be in a storage medium mature in the art, such as a random memory, a flash memory, a read-only memory, a programmable read-only memory or electrically erasable programmable memory, or a register. The storage medium is in the memory, and the processor reads information in the memory and accomplishes the steps of the above-mentioned methods in conjunction with hardware thereof.

A computer readable storage medium is also provided in embodiments of this specification. The present specification is configured to store one or more programs, which include instructions. The instructions, when executed by an electronic device including a plurality of application programs, enable the electronic device to execute a method for refreshing a first screen and a second screen of a head-mounted display device, specifically:

from a first time point to a second time point, sending first data to both the first screen and the second screen, and writing the first data to the first screen, with the first screen configured to be in a black screen state, and the second screen configured to be in a bright screen state for at least part of the time; and from the second time point to a third time point, sending second data to both the first screen and the second screen, and writing the second data to the second screen, with the second screen configured to be in the black screen state, and the first screen configured to be in the bright screen state for at least part of the time to display the first data.

The system, apparatus, modules, or units set forth in the above embodiments may specifically be implemented by a computer chip or entity, or by a product with certain functionality. A typical implementation device is a computer.

For the convenience of description, the above-mentioned apparatus is described by respectively describing various units thereof divided according to functions. Of course, in the implementation of this specification, the functions of the respective units may be implemented in one same or more software and/or hardware.

Those skilled in the art should appreciate that the embodiments of this specification may be provided as a method, an apparatus or a computer program product. Therefore, this specification may be embodied in the form of an all-hardware embodiment, an all-software embodiment or an embodiment of software and hardware in combination. Moreover, this specification may also be in the form of a computer program product that can be implemented on one or more computer usable storage media (including but not limited to magnetic disk memories, CD-ROMs, optical memories, etc.) containing computer usable program codes.

This specification is described with reference to the flow diagrams and/or block diagrams of the method, device (system) and computer program product of the embodiments of this specification. It shall be appreciated that respective flows and/or blocks in the flow diagrams and/or the block diagrams and combinations of the flows and/or the blocks in the flow diagram and/or the block diagram may be embodied in computer program instructions. These computer program instructions may be provided on a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow diagrams and/or the block(s) of the block diagrams.

These computer program instructions may also be stored into a computer readable memory capable of directing the computer or the other programmable data processing device to operate in a specific manner so that the instructions stored in the computer readable memory create an article of manufacture including instruction means which perform the functions specified in the flow(s) of the flow diagrams and/or the block(s) of the block diagrams.

These computer program instructions may also be loaded onto the computer or the other programmable data processing device so that a series of operational steps are performed on the computer or the other programmable data processing device to create a computer implemented process so that the instructions executed on the computer or the other programmable device provide steps for performing the functions specified in the flow(s) of the flow diagrams and/or the block(s) of the block diagrams.

In a typical configuration, the computing device includes one or more processors (CPUs), input/output interfaces, network interfaces, and internal storages.

The internal storage may include, in the category of computer readable media, a volatile memory, random access memory (RAM) and/or non-volatile memory, such as read-only memory (ROM) or flash memory (flash RAM). The internal storage is an example of a computer readable medium.

The computer readable media include non-volatile and volatile, removable and non-removable media, and may use any method or technology to implement information storage. The information may be computer readable instructions, data structures, modules of a program, or other data.

It should also be noted that the terms "comprise", "include" or any other variations thereof are intended to encompass non-exclusive inclusion, such that a process, method, item or device that comprises a series of elements comprises not only those elements, but also other elements not explicitly listed, or elements inherent to such a process, method, item or device. Without more limitations, elements defined by the wording "comprising a . . . " do not exclude the presence of other identical elements in the process, method, article or device including the elements.

The embodiments in the specification are described in a progressive manner. For the same and similar parts between the embodiments, reference may be made to each other.

Each embodiment focuses on differences from other embodiments. In particular, a system embodiment, which is substantially similar to a method embodiment, is described relatively simply, and for its relevant parts, reference may be made to parts of description of the method embodiment.

The above description is only description of preferred embodiments of the present disclosure and technical principles applied thereto. It should be understood by those skilled in the art that the scope of the application involved in the embodiments of the present disclosure is not limited to the technical solution formed by a particular combination of the above technical features, but should also cover other technical solutions formed by any combination of the above technical features or their equivalent features without departing from the above application concept. For example, it covers a technical solution formed by interchanging the above features with (but not limited to) technical features having similar functions disclosed in the embodiments of the present disclosure.

The invention claimed is:

1. A method for refreshing a first screen and a second screen of a head-mounted display device, wherein when a user wears the head-mounted display device, an image displayed by the first screen falls in a visual scope of one eye of the user, and an image displayed by the second screen falls in a visual scope of the other eye of the user, the method comprising:
   from a first time point to a second time point, sending first data to both the first screen and the second screen, and writing the first data to the first screen, with the first screen configured to be in a black screen state, and the second screen configured to be in a bright screen state for at least part of the time; and
   from the second time point to a third time point, sending second data to both the first screen and the second screen, and writing the second data to the second screen, with the second screen configured to be in the black screen state, and the first screen configured to be in the bright screen state for at least part of the time to display the first data,
   acquiring a first pose of the user at a first preset time point, and calculating a first estimated pose of the user at a third preset time point based on the first pose of the user, wherein the first preset time point is prior to the first time point, and the third preset time point is between the second time point and the third time point;
   acquiring a second pose of the user at a second preset time point, and calculating a second estimated pose of the user at the third preset time point based on the second pose of the user, wherein the second preset time point is between the first preset time point and the first time point; and
   at the second preset time point, shifting at least a portion of the first data based on the first estimated pose and the second estimated pose, such that the shifted first data corresponds to a pose of the user at the third preset time point.

2. The method according to claim 1, wherein a time interval between the first time point and the second time point is equal to a time interval between the second time point and the third time point.

3. The method according to claim 1, wherein the first data and the second data are configured as image data, the image data is transmitted at frames per second synchronized with a refresh rate of the first screen and the second screen, and at least one of the first time point, the second time point, and the third time point is a time point of acquiring a vertical synchronization signal of the first screen and the second screen.

4. The method according to claim 1, wherein the first data comprises a first full frame of data, and the second data comprises a second full frame of data, the first full frame of data and the second full frame of data being configured in one of following manners:
   the first full frame of data and the second full frame of data are configured as same image data; and
   the first full frame of data is configured as left eye image data, and the second full frame of data is configured as right eye image data.

5. The method according to claim 4, wherein the left eye image data and the right eye image data are configured as image data with parallax to achieve a stereoscopic display effect.

6. The method according to claim 1, wherein the first data comprises a first portion of data of a third full frame of data, and the second data comprises a second portion of data of the third full frame of data, the first portion of data and the second portion of data constituting the third full frame of data, and the first portion of data and the second portion of data being configured in one of following manners:
   the first portion of data and the second portion of data are configured as same image data; and
   the first portion of data is configured as left eye image data, and the second portion of data is configured as right eye image data.

7. The method according to claim 1,
   wherein the third preset time point is the third time point; and the method further comprises:
   at the second preset time point, shifting at least a portion of the second data based on the first estimated pose and the second estimated pose of the user, such that the shifted first data and second data correspond to a pose of the user at the third preset time point.

8. The method according to claim 1, further comprising:
   from the third time point to a fourth time point, configuring the first screen to be in the black screen state, and the second screen to be in the bright screen state for at least part of the time to display the second data;
   calculating a third estimated pose of the user at a fifth preset time point based on the first pose, wherein the fifth preset time point is between the third time point and the fourth time point;
   acquiring a third pose of the user at a fourth preset time point, and calculating a fourth estimated pose of the user at a fifth preset time point based on the third pose of the user, wherein the fourth preset time point is between the first time point and the second time point; and
   at the fourth preset time point, shifting at least a portion of the second data based on the third estimated pose and the fourth estimated pose of the user, such that the shifted second data corresponds to a pose of the user at the fifth preset time point.

9. The method according to claim 1, wherein before at least one of following two operations, the method further comprises:
   receiving a time alignment request from a host device connected to the head-mounted display device, the time alignment request comprising a first time of the host device and a time alignment protocol;

acquiring a second time of the head-mounted display device;

sending the first time and the second time to the host device; and acquiring a third time of the host device, to obtain a difference between a system time of the host device and a system time of the head-mounted display device based on the first time, the second time, and the third time, wherein the two operations comprise:

sending first data to both the first screen and the second screen, and writing the first data to the first screen, with the first screen configured to be in a black screen state, and the second screen configured to be in a bright screen state for at least part of the time; and sending second data to both the first screen and the second screen, and writing the second data to the second screen, with the second screen configured to be in the black screen state, and the first screen configured to be in the bright screen state for at least part of the time to display the first data.

10. The method according to claim 1, further comprising at least one of following two operations:

controlling the first screen and the second screen to be in the black screen state or the bright screen state by sending a signal to the first screen and the second screen; and setting the first screen and the second screen to be in the black screen state or the bright screen state according to a preset cycle.

11. A head-mounted display device, comprising:

a first screen and a second screen, the first screen and the second screen corresponding to two eyes of a user, respectively; and a screen control chip, which is coupled to the first screen and the second screen and is configured to:

from a first time point to a second time point, send first image data to both the first screen and the second screen, and write the first image data to the first screen, to configure the first screen not to display the image data and the second screen to display image data that has been written thereto; and from the second time point to a third time point, send second image data to both the first screen and the second screen, and write the second image data to the second screen, to configure the second screen to not display the image data and the first screen to display the first image data that has been written thereto, acquiring a first pose of the user at a first preset time point, and calculating a first estimated pose of the user at a third preset time point based on the first pose of the user, wherein the first preset time point is prior to the first time point, and the third preset time point is between the second time point and the third time point;

acquiring a second pose of the user at a second preset time point, and calculating a second estimated pose of the user at the third preset time point based on the second pose of the user, wherein the second preset time point is between the first preset time point and the first time point; and at the second preset time point, shifting at least a portion of the first data based on the first estimated pose and the second estimated pose, such that the shifted first data corresponds to a pose of the user at the third preset time point.

12. The head-mounted display device according to claim 11, wherein the screen control chip comprises a buffer, and the buffer is capable of storing less than one full frame of image data.

13. The head-mounted display device according to claim 11, comprising:

a USB interface configured to be connected to a host device to receive data from the host device, the data being transmitted to the screen control chip via the USB interface, the data comprising the first image data and the second image data.

14. The head-mounted display device according to claim 11, wherein from the first time point to the second time point, the first screen is configured to be in a black screen state, and the second screen is configured to be in a bright screen state for at least part of the time; and from the second time point to the third time point, the second screen is configured to be in the black screen state, and the first screen is configured to be in the bright screen state for at least part of the time.

15. The head-mounted display device according to claim 11, wherein the screen control chip is further configured to receive video data from a host device connected to the head-mounted display device, and the video data comprising the first image data and the second image data.

16. The head-mounted display device according to claim 15, wherein the video data from the host device is transmitted to the screen control chip via the DisplayPort DP protocol.

17. The head-mounted display device according to claim 15, wherein the host device is configured to perform an asynchronous timewarp operation, and shifted data is transmitted to the head-mounted display device, the shifted data comprising the first image data and the second image data.

18. A non-transitory computer readable storage medium configured to store computer instructions, wherein the computer instructions are configured to cause a computer to execute a method for refreshing a first screen and a second screen of a head-mounted display device, when a user wears the head-mounted display device, an image displayed by the first screen falls in a visual scope of one eye of the user, and an image displayed by the second screen falls in a visual scope of the other eye of the user, the method comprising:

from a first time point to a second time point, sending first image data to both the first screen and the second screen, and writing the first image data to the first screen, to configure the first screen not to display image data, and the second screen to display image data that has been written thereto; and from the second time point to a third time point, sending second image data to both the first screen and the second screen, and writing the second image data to the second screen, to configure the second screen not to display image data, and the first screen to display the first image data that has been written thereto, acquiring a first pose of the user at a first preset time point, and calculating a first estimated pose of the user at a third preset time point based on the first pose of the user, wherein the first preset time point is prior to the first time point, and the third preset time point is between the second time point and the third time point;

acquiring a second pose of the user at a second preset time point, and calculating a second estimated pose of the user at the third preset time point based on the second pose of the user, wherein the second preset time point is between the first preset time point and the first time point; and at the second preset time point, shifting at least a portion of the first data based on the first estimated pose and the second estimated pose, such that the shifted first data corresponds to a pose of the user at the third preset time point.

19. The non-transitory computer readable storage medium according to claim 18, wherein at least one of the first time point, the second time point, and the third time point is a time point of acquiring a vertical synchronization signal of the first screen and the second screen.

20. The head-mounted display device according to claim 18, wherein a time interval between the first time point and the second time point is equal to a time interval between the second time point and the third time point.

* * * * *